United States Patent [19]

Evans et al.

[11] 4,390,604

[45] Jun. 28, 1983

[54] COMPLEX METAL SULFIDE CATHODES FOR NONAQUEOUS CELLS

[75] Inventors: William P. Evans, Rocky River; Violeta Z. Leger, North Olmsted, both of Ohio

[73] Assignee: Union Carbide Corporation, Danbury, Conn.

[21] Appl. No.: 278,896

[22] Filed: Jun. 29, 1981

[51] Int. Cl.³ ............... H01M 6/14; H01M 4/58; H01M 4/52; H01M 4/56
[52] U.S. Cl. ............... 429/197; 429/223; 429/225; 429/224; 429/229; 429/222; 429/221; 429/218; 429/219
[58] Field of Search ............... 429/197, 218, 221, 232, 429/226, 223, 224, 225, 227, 222, 229; 252/182.1, 518, 519

[56] References Cited

U.S. PATENT DOCUMENTS

| 162,872 | 6/1980 | Evans et al. | |
|---|---|---|---|
| 3,877,988 | 4/1975 | Dey et al. | 429/194 |
| 4,136,233 | 1/1979 | Eisenberg | |
| 4,143,213 | 3/1979 | Jacobson et al. | 429/194 |
| 4,148,977 | 4/1979 | Eisenberg | |
| 4,317,873 | 3/1982 | Le Mehaute et al. | 429/197 |

FOREIGN PATENT DOCUMENTS 2381395 2/1977 France .

Primary Examiner—Donald L. Walton
Assistant Examiner—Stephen J. Kalafut
Attorney, Agent, or Firm—Cornelius F. O'Brien

[57] ABSTRACT

A solid cathode for nonaqueous cells comprising complex metal sulfides such as $PbFeS_2$, $Co_{0.5}Fe_{1.5}S_2$, $Co_{1.5}Fe_{0.5}S_2$ and $CoFeS_2$.

12 Claims, 6 Drawing Figures

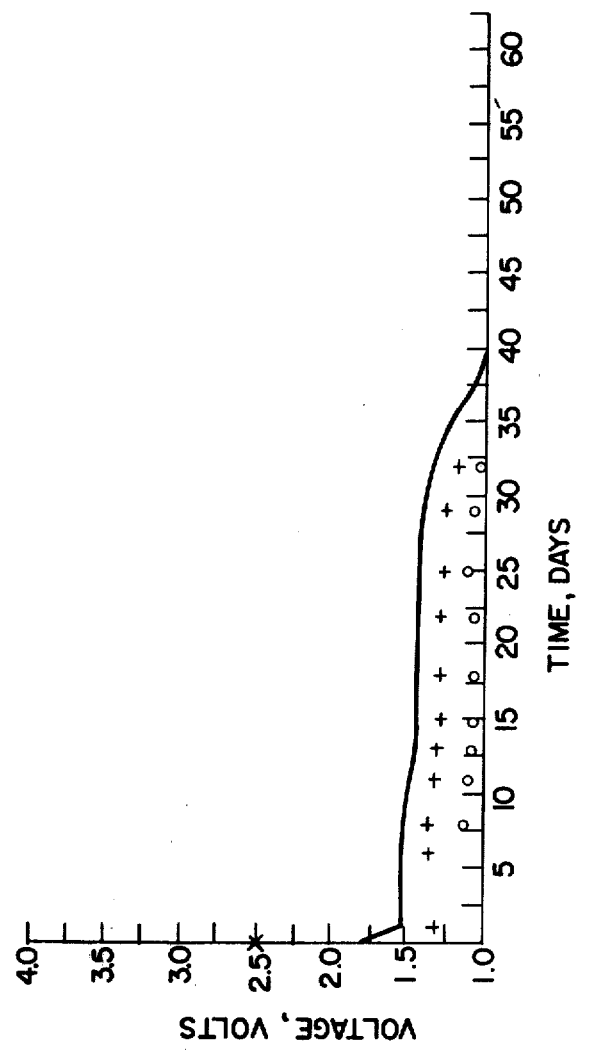

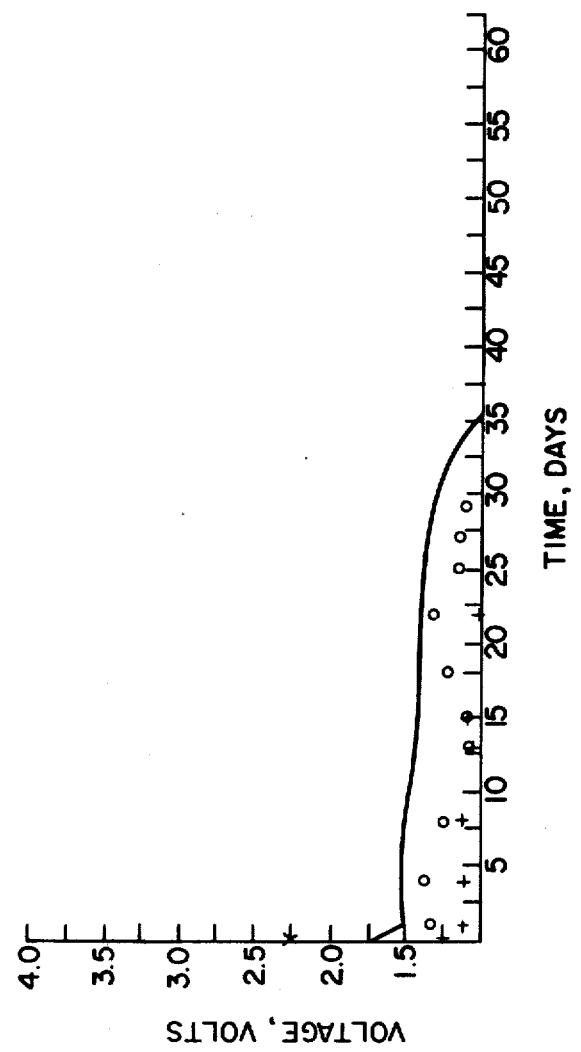

COMPLEX METAL SULFIDE CATHODES FOR NONAQUEOUS CELLS

FIELD OF THE INVENTION

The invention relates to a nonaqueous cell employing an active metal anode such as lithium, an organic electrolyte solution, and a novel complex metal sulfide having the formula $$M_aFe_bS_c$$

where
M is one or more mono- or divalent metals selected from the group consisting of Co, Ni, Sn, Pb, Mn, Zn, Cd, Hg and Ag;
Fe is divalent iron;
S is sulfur (as sulfide);
a and b are each greater than 0 with the proviso that a+b=2 when M is divalent and a+b=3 when M is monovalent; and
c=2.

BACKGROUND OF THE INVENTION

The development of high energy battery systems requires the compatibility of an electrolyte possessing desirable electrochemical properties with highly reactive anode materials, such as lithium, sodium, and the like, and the efficient use of high energy density cathode materials. The use of aqueous electrolytes is precluded in these systems since the anode materials are sufficiently active to react with water chemically. It has, therefore, been necessary in order to realize the high energy density obtainable through the use of these highly reactive anodes and high energy density cathodes to turn to the investigation of nonaqueous electrolyte systems and more particularly to nonaqueous organic electrolyte systems. A large number of nonaqueous organic electrolyte solutions is taught in the art as being suitable for a wide variety of cell systems.

Although a large number of known solid cathode materials is suitable for nonaqueous cell systems, there is always a need for new solid cathode materials to help fill the demand created by the large number of battery-powered devices being marketed. For example, the toy industry has recently embarked upon a program of marketing a multiplicity of computerized games some of which are educational in nature. Many of these devices require portable power sources and, therefore, any new cell system would be welcomed.

It is an object of the present invention to provide new solid cathode materials for nonaqueous cell systems.

It is another object of the present invention to provide a new nonaqueous cell system employing new solid cathode materials of complex metal sulfides.

Another object of the present invention is to provide new cathode materials such as $PbFeS_2$, $Co_{0.5}Fe_{1.5}S_2$, $Co_{1.5}Fe_{0.5}S_2$ and $CoFeS_2$.

SUMMARY OF THE INVENTION

The invention is directed to a new solid cathode material for nonaqueous cell systems which comprises a metal sulfide having the formula $$M_aFe_bS_c$$

where

M is one or more mono- or divalent metals selected from the group consisting of Co, Ni, Sn, Pb, Mn, Zn, Cd, Hg and Ag;
Fe is divalent iron;
S is sulfur (as sulfide);
a and b are each greater than 0 with the proviso that a+b=2 when M is divalent and a+b=3 when M is monovalent; and
c=2.

Examples of cathodes of this invention are $Co_{1.5}Fe_{0.5}S_2$, $PbFeS_2$, $Co_{0.5}Fe_{1.5}S_2$ and $CoFeS_2$. The cathode material $CoFeS_2$ can generally be prepared by heating elemental iron, cobalt and sulfur at 550° C. for about 1.5 hours. Compounds utilizing other proportions of these reactants are exemplified by $Co_{0.5}Fe_{1.5}S_2$ and $Co_{1.5}Fe_{0.5}S_2$ can also be prepared thermally as can $PbFeS_2$. If desired, the active cathode material can be mixed with a binder, a conductive agent and the like. Suitable binders would include polytetrafluoroethylene, polyethylene, polysulfone, polypropylene and polyamide, and conductive agents would include graphite, carbon and metal powders.

Useful highly active metal anode materials include aluminum, the alkali metals, alkaline earth metals and alloys of alkali metals or alkaline earth metals with each other and other metals. The term "alloy" as used herein is intended to include mixtures, solid solutions, such as lithium-magnesium, and intermetallic compounds, such as lithium monoaluminide.

The preferred anode materials are lithium, sodium, potassium, calcium and alloys thereof.

Useful organic solvents employed alone or mixed with one or more other solvents for use in this invention include the following classes of compounds:

Alkylene nitriles: e.g., crotonitrile (liquid range −51.1° C. to 120° C.)
Trialkyl borates: e.g., trimethyl borate, $(CH_3O)_3B$ (liquid range −29.3° to 67° C.)
Tetraalkyl silicates: e.g., tetramethyl silicate, $(CH_3O)_4Si$ (boiling point 121° C.)
Nitroalkanes: e.g., nitromethane, $CH_3NO_2$ (liquid range −17° to 100.8° C.)
Alkylnitriles: e.g., acetonitrile, $CH_3CN$ (liquid range −45° to 81.6° C.)
Dialkylamides: e.g., dimethylformamide, $HCON(CH_3)_2$ (liquid range −60.48° to 149° C.)
Lactams: e.g., N-methylpyrrolidone,

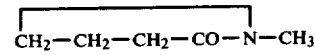

(liquid range −16° to 202° C.)
Tetraalkylureas: e.g., tetramethylurea, $(CH_3)_2N$-CO-$N(CH_3)_2$ (liquid range −1.2° to 166° C.)
Monocarboxylic acid esters: e.g., ethyl acetate (liquid range −83.6° to 77.06° C.)
Orthoesters: e.g., trimethylorthoformate, $HC(OCH_3)_3$ (boiling point 103° C.)
Lactones: e.g., γ-(gamma)butyrolactone,

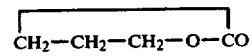

(liquid range −42° to 206° C.)
Dialkyl carbonates: e.g., dimethyl carbonate, $OC(OCH_3)_2$ (liquid range 2° to 90° C.)

Alkylene carbonates: e.g., propylene carbonate,

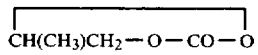

(liquid range −48° to 242° C.)
Monoethers: e.g., diethyl ether (liquid range −116° to 34.5° C.)
Polyethers: e.g., 1,1- and 1,2-dimethoxyethane (liquid ranges −113.2° to 64.5° C. and −58° to 83° C., respectively)
Cyclic ethers: e.g., tetrahydrofuran (liquid range −65° to 67° C.); 1,3-dioxolane (liquid range −95° to 78° C.)
Nitroaromatics: e.g., nitrobenzene (liquid range 5.7° to 210.8° C.)
Aromatic carboxylic acid halides: e.g., benzoyl chloride (liquid range 0° to 197° C.); benzoyl bromide (liquid range −24° to 218° C.)
Aromatic sulfonic acid halides: e.g., benzene sulfonyl chloride (liquid range 14.5° to 251° C.)
Aromatic phosphonic acid dihalides: e.g., benzene phosphonyl dichloride (boiling point 258° C.)
Aromatic thiophosphonic acid dihalides: e.g., benzene thiophosphonyl dichloride (boiling point 124° C. at 5 mm.)
Cyclic sulfones: e.g., sulfolane,

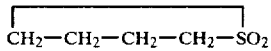

(melting point 22° C.); 3-methylsulfolane (melting point −1° C.)
Alkyl sulfonic acid halides: e.g., methanesulfonyl chloride (boiling point 161° C.)
Alkyl carboxylic acid halides: e.g., acetyl chloride (liquid range −112° to 50.9° C.); acetyl bromide (liquid range −96° to 76.° C.); propionyl chloride (liquid range −94° to 80° C.)
Saturated heterocyclics: e.g., tetrahydrothiophene (liquid range −96° to 121° C.); 3-methyl-2-oxazolidone (melting point 15.9° C.)
Dialkyl sulfamic acid halides: e.g., dimethyl sulfamyl chloride (boiling point 80° C. at 16 mm.)
Alkyl halosulfonates: e.g., ethyl chlorosulfonate (boiling point 151° C.)
Unsaturated heterocyclic carboxylic acid halides: e.g., 2-furoyl chloride (liquid range −2° to 173° C.)
Five-membered unsaturated heterocyclics: e.g., 3,5-dimethylisoxazole (boiling point 140° C.); 1-methylpyrrole (boiling point 114° C.); 2,4-dimethylthiazole (boiling point 144° C.); furan (liquid range −85.65° to 31.36° C.)
Esters and/or halides of dibasic carboxylic acids: e.g., ethyl oxalyl chloride (boiling point 135° C.)
Mixed alkyl sulfonic acid halides and carboxylic acid halides: e.g., chlorosulfonyl acetyl chloride (boiling point 98° C. at 10 mm.)
Dialkyl sulfoxides: e.g., dimethyl sulfoxide (liquid range 18.4° to 189° C.)
Dialkyl sulfates: e.g., dimethylsulfate (liquid range −31.75° to 188.5° C.)
Dialkyl sulfites: e.g., dimethylsulfite (boiling point 126° C.)
Alkylene sulfites: e.g., ethylene glycol sulfite (liquid range −11° to 173° C.)
Halogenated alkanes: e.g., methylene chloride (liquid range −95° to 40° C.); 1,3-dichloropropane (liquid range −99.5° to 120.4° C.)

Of the above, the preferred solvents are sulfolane; crotonitrile; nitrobenzene; tetrahydrofuran; methyl-substituted tetrahydrofuran; 1,3-dioxolane; 3-methyl-2-oxazolidone; propylene carbonate; γ-butyrolactone; ethylene glycol sulfite; dimethylsulfite; dimethyl sulfoxide; and 1,1- and 1,2-dimethoxyethane. Of the preferred solvents, the best are sulfolane; 3-methyl-2-oxazolidone; propylene carbonate 1,1- and 1,2-dimethoxyethane, and 1,3-dioxolane because they appear more chemically inert to battery components and have wide liquid ranges, and especially because they permit highly efficient utilization of the cathode materials.

The best electrolyte for use in this invention is a 3-methyl-2-oxazolidone-based electrolyte. Liquid organic 3-methyl-2-oxazolidone material, (3Me2Ox)

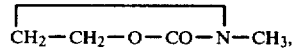

is an excellent nonaqueous solvent because of its high dielectric constant, chemical inertness to battery components, wide liquid range and low toxicity.

However, it has been found that when metal salts are dissolved in liquid 3Me2Ox for the purpose of improving the conductivity of 3Me2Ox, the viscosity of the solution may be too high for its efficient use as an electrolyte for some nonaqueous cell applications other than those requiring very low current drains. Thus, in some applications in accordance with this invention, the addition of a low viscosity cosolvent would be desirable if 3Me2Ox is to be used as an electrolyte for nonaqueous cells which can operate or perform at a high energy density level.

The low viscosity cosolvents which can be used along with 3Me2Ox include tetrahydrofuran (THF), methyl-substituted tetrahydrofuran (Met-THF) dioxolane (DIOX), dimethoxyethane (DME), dimethyl isoxazole (DMI), diethyl carbonate (DEC), ethylene glycol sulfite (EGS), dioxane, dimethyl sulfite (DMS) or the like. Dimethoxyethane (DME), dioxolane (DIOX) are preferred cosolvents because of their compatibility with metal salts dissolved in liquid 3Me2Ox and their chemical inertness to cell components. Specifically, the total amount of the low viscosity cosolvent added could be between about 20% and about 80% based on total solvent volume, i.e., exclusive of solute, so as to lower the viscosity to a level suitable for use in a high drain cell.

The ionizing solute for use in the invention may be simple or double salt or mixtures thereof, for example, $LiCF_3SO_3$, $LiBF_4$ and $LiClO_4$ which will produce an ionically conductive solution when dissolved in one or more solvents. Preferred solutes are complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226-July/December 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. One such double salt, for example, is that formed by the combination of aluminum chloride and lithium chloride to yield lithium aluminum tetrachloride.

BRIEF DESCRIPTION OF THE DRAWINGS

FIG. 5 contains data showing the discharge characteristics of the cell disclosed and described in Example V.

FIG. 6 contains data showing the discharge characteristics of the cell disclosed and described in Example VI.

EXAMPLE I

A flat-type cell was constructed utilizing a stainless steel base having therein a shallow depression into which the cell contents were placed and over which a stainless steel cap was placed to close the cell. The contents of each sample cell consisted of a 0.591 inch diameter lithium disc (0.114 g) having a total thickness of 0.050 inch, about 1.5 ml of an electrolyte consisting of about 40 vol. % dioxolane, about 30 vol. % dimethoxyethane (DME), about 30 vol. % 3Me2Ox plus about 0.1% dimethylisoxazole (DMI) and containing 1 M $LiCF_3SO_3$, a 0.875 inch diameter porous nonwoven polypropylene separator (0.01 inch thick) which absorbed some of the electrolyte and 0.318 gram of a cathode mix compressed to form a cathode. The cathode mix consisted of 85% $CoFeS_2$, 10% acetylene black and 5% polytetrafluoroethylene. The cell was discharged across a 15K-ohm load and the voltage observed with time is shown as the curve in FIG. 1. In addition, at various time periods, the cell was discharged across a 1K-ohm load (pulse discharge) for about 2 seconds, and the voltages observed are shown as the points identified as "+" in FIG. 1.

EXAMPLE II

Figure 2:
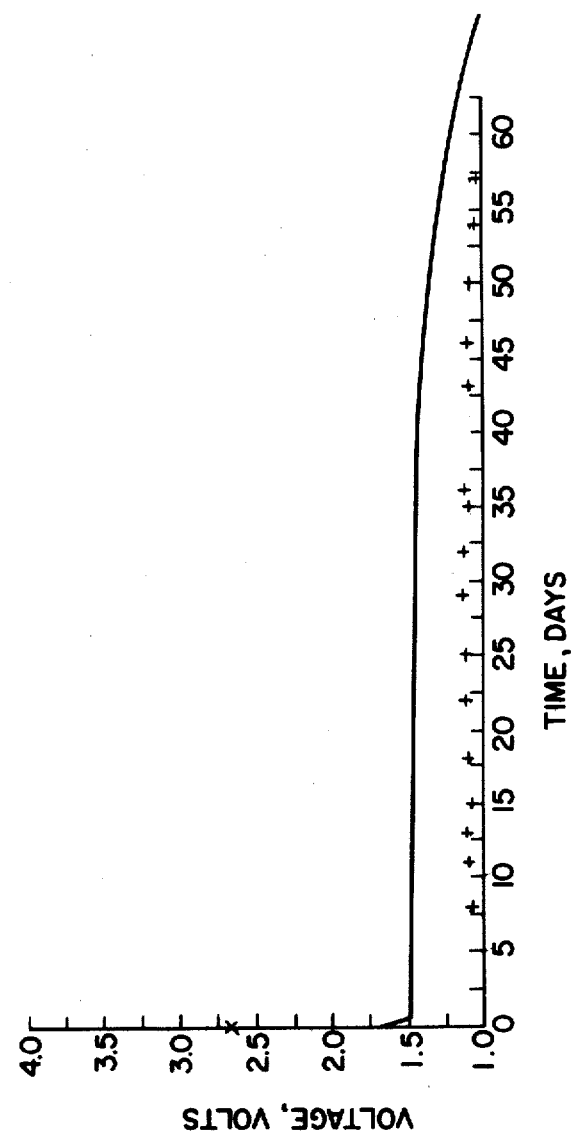
FIG. 2 contains data showing the discharge characteristics of the cell disclosed and described in Example II.

A flat-type cell was made as in Example I and tested in the same manner except the pulse discharge test was across a 300-ohm load for 2 second periods. The voltages observed on the pulse discharge test are shown as the points identified as "+" in FIG. 2.

EXAMPLE III

Figure 3:
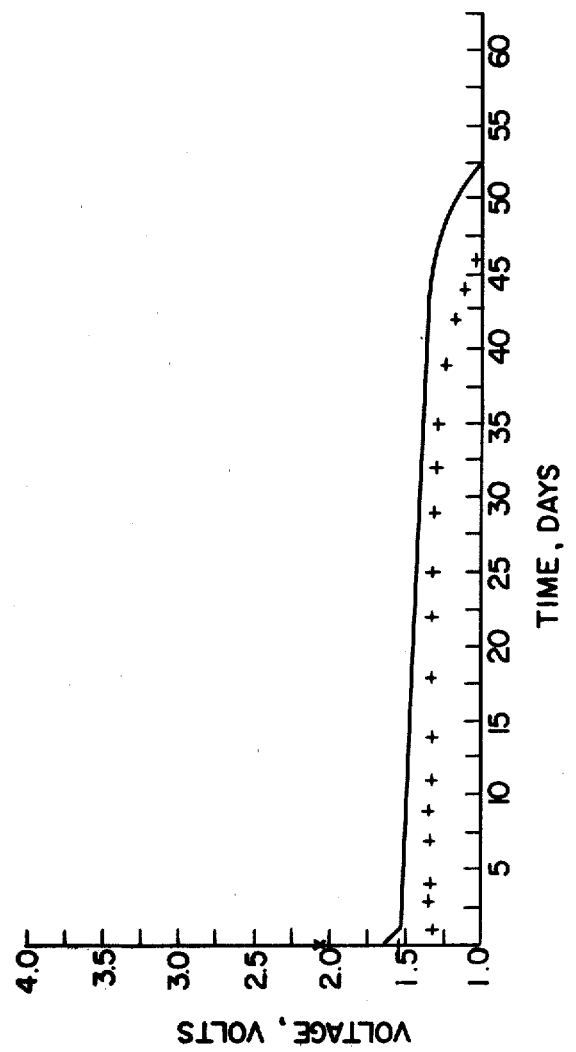
FIG. 3 contains data showing the discharge characteristics of two cells disclosed and described in Example III.

A button cell nominally measuring 0.165 inch high and 0.455 inch in diameter was constructed using the same active components as described in Example I. The button cell was discharged across a 15K-ohm load and the voltage observed with time is shown as the curve in FIG. 3. In addition, at various time periods, the cell was discharged across a 1K-ohm load (pulse discharge) for about 2 seconds, and the voltages observed are shown as the points identified as "+" in FIG. 3.

EXAMPLE IV

Figure 4:
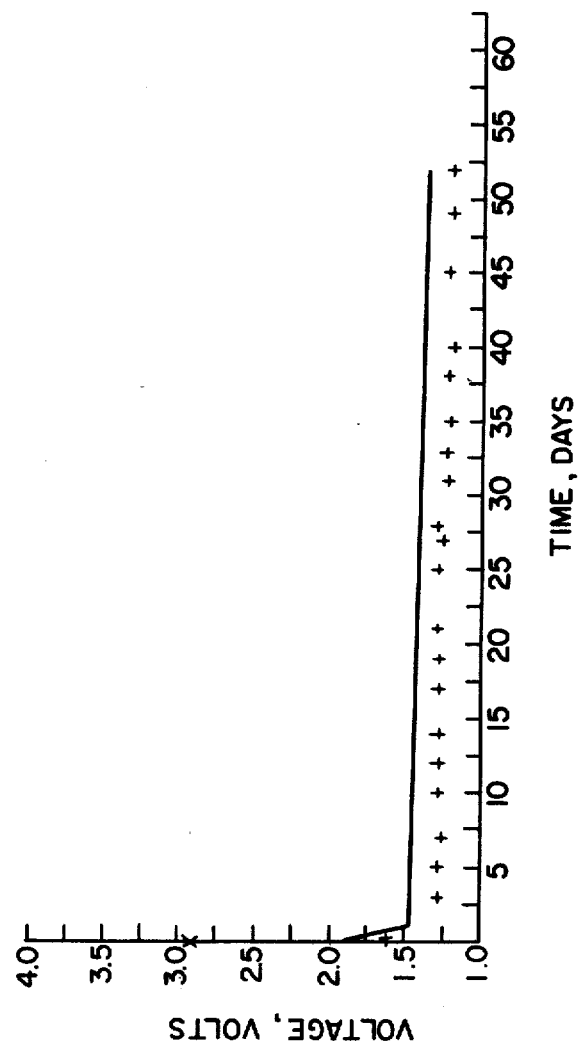
FIG. 4 contains data showing the discharge characteristics of the cell disclosed and described in Example IV.

A flat-type cell was constructed as in Example I using the same components except that the active cathode employed was $Co_{0.5}Fe_{1.5}S_2$. The cell was discharged across a 15K-ohm load and the voltage observed with time is shown as the curve in FIG. 4. In addition, at various time periods, the cell was discharged across a 1K-ohm load (pulse discharge) for about 2 seconds and the voltages observed are shown as the points identified as "+" in FIG. 4.

EXAMPLE V

Figure 1:
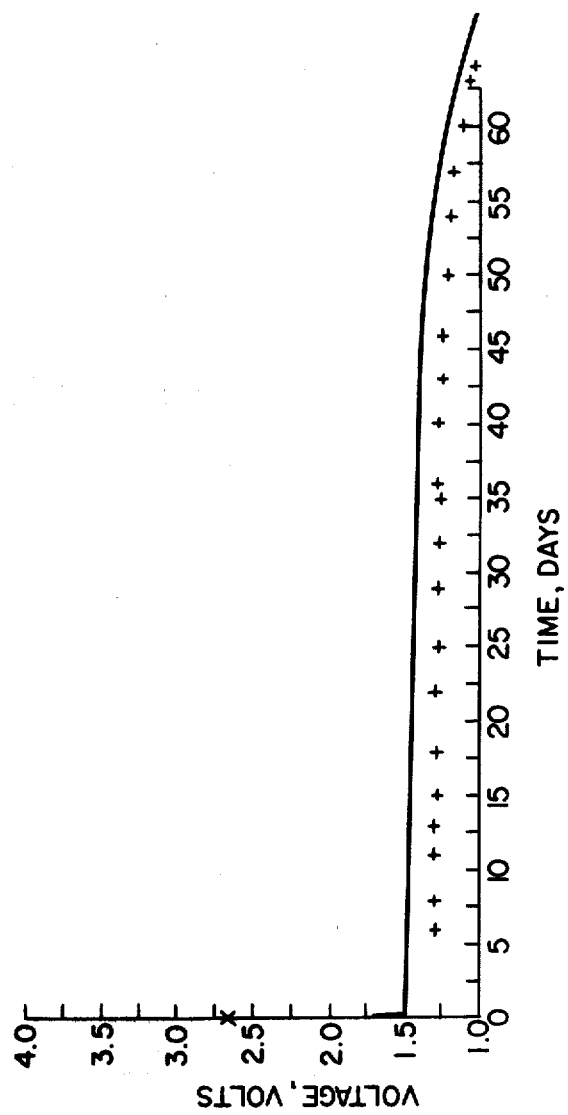
FIG. 1 contains data showing the discharge characteristics of the cell disclosed and described in Example I.

A flat-type cell was constructed as in FIG. 1 using the same components except the active cathode employed was $PbFeS_2$. The cell was discharged across a 15K-ohm load and the voltage observed with time is shown as the curve in FIG. 5. In addition, at various time periods, the cell was discharged across a 1-K ohm load or a 300-ohm load (pulse discharge) for about 2 seconds and the voltages observed are shown as the points identified as "+" and "o", respectively, in FIG. 5.

EXAMPLE VI

A button cell, nominally 0.165 inch high and 0.455 inch diameter, was constructed with the same active components as described in Example V. The cell was discharged across a 15K-ohm load and the voltage observed with time is shown as the curve in FIG. 5. In addition, various time periods, the cell was discharged across a 1K-ohm load or a 300-ohm load (pulse discharge) for 2 seconds and the voltages observed are shown as the points identified as "o" and "+", respectively, in FIG. 6.

While the present invention has been described with reference to many particular details thereof, it is not intended that these details shall be construed as limiting the scope of this invention.

What is claimed is:

1. A solid cathode material for nonaqueous cell systems which comprises a metal sulfide selected from the group consisting of $PbFeS_2$ and a material having the formula $$M_aFe_bS_c$$

where

M is one or more mono- or divalent metals selected from the group consisting of Co, Ni, Sn, Mn, Zn, Cd, Hg and Ag;

Fe is divalent iron;

S is sulfur (as sulfide);

a and b are each greater than 0 with the proviso that $a+b=2$ when M is divalent and $a+b=3$ when M is monovalent; and $c=2$.

2. The solid cathode material of claim 1 selected from the group consisting of $CoFeS_2$, $Co_{0.5}Fe_{1.5}S_2$ and $Co_{1.5}Fe_{0.5}S_2$.

3. The solid cathode material of claim 1 or 2 wherein a conductive agent is added.

4. The solid cathode material of claim 3 and wherein a binder is added.

5. The solid cathode material of claim 3 wherein the conductive agent is at least one material selected from the group consisting of graphite, carbon and metal powders.

6. The solid cathode material of claim 3 wherein a binder is added, said binder being at least one material selected from the group consisting of polytetrafluoroethylene, polyethylene, polysylfone, polypropylene and polyamide.

7. A nonaqueous cell comprising an active anode, an organic electrolyte solution and a solid cathode material comprising a metal sulfide selected from the group consisting of $PbFeS_2$ and a material having the formula $$M_aFe_bS_c$$

where

M is one or more mono- or divalent metals selected from the group consisting of Co, Ni, Sn, Mn, Zn, Cd, Hg and Ag;

Fe is divalent iron;

S is sulfur (as sulfide);

a and b are each greater than 0 with the proviso that $a+b=2$ when M is divalent and $a+b=3$ when M is monovalent; and $c=2$.

8. The nonaqueous cell of claim 7 wherein the solid cathode material is selected from the group consisting of $CoFeS_2$, $Co_{0.5}Fe_{1.5}S_2$ and $Co_{1.5}Fe_{0.5}S_2$.

9. The nonaqueous cell of claim 7 or 8 wherein at least one material selected from the group consisting of graphite, carbon, metal powders, polytetrafluoroethylene, polyethylene, polysulfone, polypropylene and polyamide is added to the solid cathode material.

10. The nonaqueous cell of claim 9 wherein the active metal anode is selected from the group consisting of lithium, sodium, potassium, calcium and alloys thereof.

11. The nonaqueous cell of claim 10 wherein the solvent of the electrolyte is at least one solvent selected from the group consisting of sulfolane; crotonitrile; nitrobenzene; tetrahydrofuran; methyl-substituted tetrahydrofuran; 1,3-dioxolane; 3-methyl-2-oxazolidone; propylene carbonate; γ-butyrolactone; ethylene glycol sulfite; dimethylsulfite; dimethyl sulfoxide; 1,1- and 1,2-dimethoxyethane; and dimethyl isoxazole.

12. The nonaqueous cell of claim 11 wherein said at least one solvent is 3-methyl-2-oxazolidone along with a low viscosity solvent selected from the group consisting of tetrahydrofuran, methyl-substituted tetrahydrofuran, dioxolane, dimethoxyethane, dimethyl isoxazole, diethyl carbonate, ethylene glycol sulfite, dioxane and dimethyl sulfite.

* * * * *